Sept. 12, 1933.  R. E. VIVIAN  1,926,072
PROCESS OF EXTRACTING PHOSPHORUS CONTENT
FROM PHOSPHORUS CONTAINING MATERIALS
Filed June 3, 1931
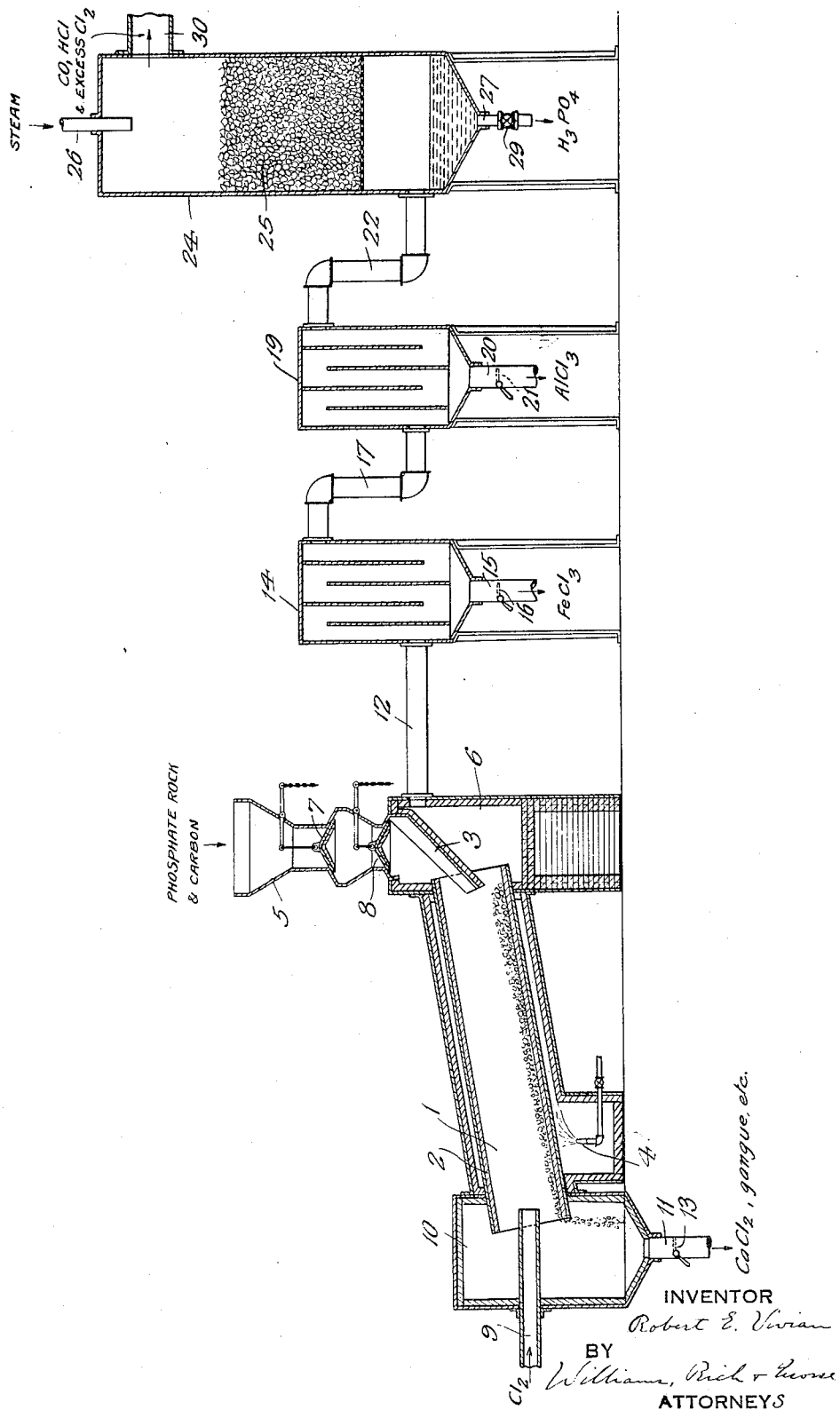
INVENTOR
Robert E. Vivian
BY
Williams, Rich & Morse
ATTORNEYS Patented Sept. 12, 1933

1,926,072

UNITED STATES PATENT OFFICE 1,926,072

PROCESS OF EXTRACTING PHOSPHORUS CONTENT FROM PHOSPHORUS CONTAINING MATERIALS

Robert E. Vivian, New York, N. Y., assignor to International Agricultural Corporation, New York, N. Y., a corporation of New York Application June 3, 1931. Serial No. 541,765

16 Claims. (Cl. 23—205)

The present invention relates generally to processes for the extraction of the phosphorus content from phosphorus-containing materials, and more particularly to a process wherein a chloride or chlorides of phosphorus are produced by chlorination of and volatilization from a phosphorus-containing material.

An object of the present invention is to produce a chloride or chlorides of phosphorus with simplicity and economy, and another object is to produce phosphoric acid also with simplicity and economy.

It is well known that volatilization of the phosphorus content of phosphate rock, by thermal decomposition or heating only, requires a very high temperature to separate the phosphorus content from the calcium content. The method generally used to facilitate volatilization of the phosphorus content consists essentially in heating the phosphate rock with a carbonaceous material, acting as a reducing agent, and silica or sand, acting as a replacing agent, a slag or residue of silicate of calcium being formed. Nevertheless, this method requires an intense heating of the charge, the temperature employed being of the order of 1300° C., more or less, depending on the particular process in which this method of volatilization is utilized, and thus incurs, among incidental disadvantages, high cost of the power or fuel necessary to produce these high temperatures, and furnace lining replacement charges due to these high temperatures.

It has been discovered that phosphorus, in the form of a chloride or chlorides of phosphorus, may be volatilized in large amount at a red heat or below red heat from a phosphatic material, such as phosphate rock, the mineral apatite, or artificially prepared calcium phosphate, by properly heating a properly proportioned mixture or charge of the phosphatic material and carbon, and treating this charge with chlorine gas, which may be passed in proper amount over the charge. This process may also be applied to the treatment of other phosphorus and oxygen containing materials, such as aluminum and iron phosphate minerals.

The temperature to be employed in the working of this process may be as low as from 600° to 800° C., but it has been found that a maximum yield of phosphorus chloride or chlorides may be obtained with the charge maintained at a temperature of from 700° to 800° C.

It is believed that the phosphorus content of the charge is converted into phosphorus pentachloride, PCl₅, combined in varying proportions, depending on the amount of chlorine used, with various other chlorides, such as phosphorus trichloride, PCl₃, and phosphorus oxychloride, POCl₃. If phosphate rock is treated for the extraction of its phosphorus content, aluminum chloride, AlCl₃, and ferric chloride, FeCl₃, are also produced as volatilized products, due to the presence of aluminum and iron in said phosphatic material. Still other products of the reaction or reactions which take place are calcium chloride, which, together with other matters, such as gangue and unreacted carbon, remain as the residue, and carbon monoxide which escapes with the fumes or volatilized products. The reaction or reactions which take place are exothermal, whereby an additional saving in the power necessary to maintain the charge at the proper temperature is effected. After the reaction or reactions have started, the heat added to the charge should therefore be suitably controlled.

The following equations are given as an indication of the character of the reactions which may be caused to take place:

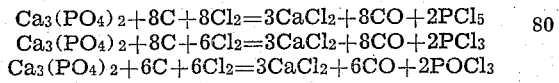

When carrying out the process, it is preferred to utilize a slight excess of carbon over the theoretical amount indicated by the first mentioned equation. For example, a ratio of three parts by weight of calcium phosphate to 1 part by weight of carbon has been found to produce satisfactory results. When using phosphate rock for the extraction of its phosphorus content, this ratio is not materially altered, due to the comparatively small amounts of aluminum and iron in said phosphatic material.

It is believed that the process may be caused to volatilize phosphorus pentachloride, substantially uncombined with other chlorides of phosphorus, if there is used an amount of chlorine in excess of the theoretical amount indicated by the first mentioned equation. The employment of an excess of chlorine is in any event advantageous in that it forces the reaction or reactions toward completion and a more rapid reaction or reactions occur with a sweeping out of the volatilized products as formed.

Important features of the invention reside in the comparatively low temperatures which may be utilized in the working of the process and the character of the residue which is formed by reason of said low temperatures. It being noted that the temperature of fusion of calcium chloride is 778° C., this residue, consisting in large part of calcium chloride, is a partially fused or sintered material, if the temperature is at or above the temperature of fusion of calcium chloride formed as a residue, and is a solid or unfused material if the temperature employed is below this temperature of fusion. The character of this residue, particularly when unfused, permits the chlorine to penetrate easily within the charge and react thoroughly with the charge. It should be noted that the calcium chloride formed by the reaction or reactions is more or less combined with certain impurities, which are apt to cause its fusion point to differ somewhat from the fusion point (778° C.) of pure calcium chloride. Consequently, preferred temperatures for the working of the process are below the temperature of fusion of the calcium chloride as modified by its impurities in the residue formed by the reaction or reactions.

It is noted that, if phosphate rock is used as the phosphatic material, silica appears to enter incidentially into the process only as an impurity of phosphate rock, its presence in the charge being apparently not required in the working of the process, as it has been determined that the production of volatilized phosphorus chloride or chlorides may be effected by using pure calcium phosphate containing no silica.

The following is an example of a process embodying the invention: A charge or mixture of powdered calcium phosphate and powdered charcoal was prepared in about the proportion of 3 parts of calcium phosphate to one part of charcoal. This charge was placed in an alundum boat in the center of an electrically heated silica tube equipped with inlet and outlet tubes at its ends. Chlorine gas was passed from the inlet tube over the charge, and this was continued for about an hour with the charge maintained at about 700° C. Evolution of much white fume was noted, the outgoing gases being led from the outlet tube through water into a scrubber bottle attached to the outlet tube. Analysis of the residue in the alundum boat showed that about 97% of the phosphorus had been volatilized, and analysis of the solution in the scrubber bottle showed a large content of phosphoric acid.

In practice, the chloride or chlorides of phosphorus liberated may be collected in any suitable manner, as for instance by a Cottrell precipitator. If the fumes evolved also contain other volatilized products, such as chloride of aluminum and chloride of iron, the latter may be collected with the chloride or chlorides of phosphorus, and the various chlorides separated by leaching and fractional crystallization. Or, the various volatlilized products, after leaving the charge, may be recovered by fractional condensation. Phosphoric acid may be produced by subjecting the chloride or chlorides of phosphorus to the action of steam, as will be hereinafter more particularly described.

The calcium chloride which is produced as a residue may be fused and electrolyzed in the molten state, whereby chlorine is recovered for further use in the process and metallic calcium produced.

In the drawing, there is schematically illustrated an apparatus by means of which a process utilizing the present invention may be carried out for the production of phosphoric acid from phosphate rock. It is understood that the illustration of this apparatus or any part thereof should not be interpreted as a limitation of the invention, as the invention may be utilized in connection with the treatment of other materials, and the process of producing phosphoric acid, which will be presently described in connection with the particular form of apparatus shown in the drawing, may be carried out with other forms of apparatus. For example, the furnace 1, in which volatilization of the phosphorus content of the charge takes place, is illustrated as of the rotary kiln type, although other types of furnace may be used. The kiln 1 should be provided with a suitable refractory lining 2, as is well understood in the art, and heat may be applied to the kiln by means of a gas or oil burner 4.

The charge, which may consist of a properly proportioned mixture of phosphate rock and carbon, is introduced into the kiln 1 through a hopper 5, located at the upper end of a chamber 6, a chute 3 being provided in said chamber 6 for directing the descending material, after leaving the hopper 5, into the upper open end of the kiln 1. The hopper 5 is fitted in the usual way with two closures or valves 7 and 8, which are opened one after the other, when introducing the charge, to prevent access of air into the interior of the apparatus. The charge may be either in the form of a mixture of the constituents stated, ground to a suitable degree of fineness, or in the form of briquettes into which the finely divided mixture is pressed. The chlorine is introduced into the kiln 1 from its lower end through a pipe 9 extending into a chamber 10 communicating with the kiln 1. As new supply of material is fed into the kiln 1 from the hopper 5, the residue formed by the reaction or reactions, consisting essentially of calcium chloride, gangue and unreacted carbon, drops to the bottom of the chamber 10, where it collects and from which it may be drawn off through an orifice 11 controlled by a closure 13. After the reaction or reactions have started, the heat supplied to the kiln 1 should be properly controlled, in view of the exothermal character of said reaction or reactions, the temperature of the charge being preferably maintained at a suitable temperature below the fusion temperature of the calcium chloride formed in the residue.

The volatilized products, consisting chiefly of phosphorus chloride or chlorides, aluminum chloride and ferric chloride, together with the excess chlorine and with oxide of carbon, enter the chamber 6, from which they pass through the pipe 12 into a condenser 14, which is maintained at the proper temperature to cause the condensation of the ferric chloride. The latter product may be collected through an orifice 15 controlled by a closure 16. The fumes, less the condensed ferric chloride, pass from the condenser 14 through a pipe 17 into another condenser 19, which is maintained at a proper temperature to cause the condensation of aluminum chloride. The latter product may be collected through an orifice 20 controlled by a closure 21. The remaining gases, consisting of chloride or chlorides of phosphorus, excess chlorine and oxide of carbon, are led from the condenser 19 through a pipe 22 into a scrubbing tower 24 and below a bed of coke 25 supported therein in any appropriate manner. Steam is introduced through a pipe 26 into the tower 24 above the bed of coke 25, so that, upon passage of the gases upwardly through the bed, the chloride or chlorides of phosphorus react with the steam to form phosphoric acid, and, possibly, other acids of phosphorus. Due to the presence of chlorine, these other acids of phosphorus may be converted into phosphoric acid. The acid or acids of phosphorus collect at the bottom of the tower 24 and may be drawn off through the orifice 27 controlled by the valve 29. Hydrochloric acid is also formed by reaction of the steam with the chloride or chlorides of phosphorus. The steam is maintained at such pressure and temperature that its temperature, when reacting, is over the boiling point of hydrochloric acid and below the boiling point of phosphoric acid, whereby the hydrochloric acid escapes in gaseous form, with any excess chlorine and oxide of carbon, from the upper portion of the tower 25 through the pipe 30.

Part or all of the excess chlorine and of the hydrochloric acid gas, which issue from the tower 25, and as much as is practicable of the oxide or carbon, which also issues from the tower 25, should be preferably conducted, with new supply of chlorine, through the furnace 1. By utilizing the excess chlorine and the hydrochloric acid gas, which is a chlorinating agent, an economy is had in the amount of chlorine which has to be supplied for the process. Also, in view of the reducing action of carbon monoxide, less carbon needs to be supplied for the charge.

In the claims, the term "calcium phosphate" includes any substance in which calcium phosphate is present.

What is claimed is:

1. A process of producing phosphorus chloride vapor consisting in heating phosphorus and oxygen containing material and carbon to a red heat or below in the presence of chlorine.

2. A process of producing phosphorus chloride vapor consisting in heating calcium phosphate and carbon to a red heat or below in the presence of chlorine.

3. A process of producing phosphorus chloride vapor consisting in heating calcium phosphate and carbon to a red heat or below in the presence of chlorine in excess of the theoretical amount necessary to yield such vapor.

4. A process of producing phosphorus chloride vapor consisting in heating calcium phosphate and carbon, maintained at a temperature of the order of from 600° to 800° C., in the presence of chlorine.

5. A process of producing phosphorus chloride vapor consisting in heating calcium phosphate and carbon, maintained at a temperature of the order of from 600° to 800° C., in the presence of an excess of chlorine in excess of the theoretical amount necessary to yield such vapor.

6. A process of producing phosphorus chloride vapor consisting in heating calcium phosphate and carbon, maintained below the fusion point of calcium chloride formed as a residue, in the presence of chlorine.

7. A process of producing phosphorus chloride vapor consisting in heating calcium phosphate and carbon, maintained below the fusion point of calcium chloride formed as a residue, in the presence of chlorine in excess of the theoretical amount necessary to yield such vapor.

8. A process of producing phosphorus chloride consisting in heating to a red heat or below and in the presence of chlorine a mixture of calcium phosphate and carbon in approximately the proportions of three parts by weight of calcium phosphate to one part by weight of carbon.

9. A process of extracting phosphorus content from phosphorus and oxygen containing material, consisting in heating such material and carbon at a red heat or below in the presence of chlorine whereby gaseous products including oxide of carbon and chloride of phosphorus are formed, and separating phosphorus chloride from said gaseous products.

10. A process of extracting phosphorus content from phosphate rock, consisting in heating phosphate rock and carbon at a red heat or below in the presence of chlorine whereby gaseous products including oxide of carbon, chloride of aluminum, chloride of iron, and chloride of phosphorus are formed, and separating chloride of phosphorus from said gaseous products.

11. A process of extracting phosphorus content from calcium phosphate, consisting in heating calcium phosphate and carbon at a red heat or below in the presence of chlorine whereby gaseous products including oxide of carbon and chloride of phosphorus are formed, said chlorine being in excess of the theoretical amount necessary to yield said gaseous products, and separating chloride of phosphorus from said gaseous products admixed with excess chlorine.

12. A process of extracting phosphorus content from phosphate rock, consisting in heating phosphate rock and carbon at a temperature of red heat or below in the presence of chlorine whereby gaseous products including chloride of aluminum, chloride of iron and chloride of phosphorus are formed, said chlorine being in excess of the theoretical amount necessary to yield said gaseous products, and separating chloride of aluminum, chloride of iron and chloride of phosphorus from said gaseous products admixed with excess chlorine.

13. The process of producing acid of phosphorus from phosphorus and oxygen containing material, consisting in heating such material and carbon at a red heat or below in the presence of chlorine whereby gaseous products including oxide of carbon and chloride of phosphorus are formed, and treating said gaseous products with steam whereby hydrocloric acid gas and acid of phosphorus are produced, drawing off the gaseous products including said oxide of carbon and said hydrochloric acid gas, and conducting to and utilizing in said heating treatment oxide of carbon and hydrocloric acid gas present in the gaseous products obtained.

14. The process of producing phosphoric acid from calcium phosphate, consisting in heating calcium phosphate and carbon at a red heat or below in the presence of chlorine whereby gaseous products including oxide of carbon and chloride of phosphorus are formed, said chlorine being in excess of the theoretical amount necessary to yield said gaseous products, and treating said gaseous products admixed with excess chlorine with steam whereby hydrochloric acid gas and phosphoric acid are produced, drawing off the gaseous products including said oxide of carbon, said hydrochloric acid gas and excess chlorine; and conducting to and utilizing in said heating treatment oxide of carbon, excess chlorine and hydrocloric acid gas present in the gaseous products drawn off.

15. The process of producing phosphoric acid from phosphate rock, consisting in heating phosphate rock and carbon at a red heat or below in the presence of chlorine whereby gaseous products including oxide of carbon, iron chloride, aluminum chloride and chloride of phosphorus are formed, said chlorine being in excess of the theoretical amount necessary to yield said gaseous products, separating iron chloride and aluminum chloride from the gaseous products admixed with excess chlorine; treating the remaining gaseous products, admixed with excess chlorine, with steam whereby hydrochloric acid gas and phosphoric acid are produced; drawing off the remaining gaseous products including said oxide of carbon, said hydrochloric acid gas and excess chlorine; and conducting to and utilizing in said heating treatment oxide of carbon, excess chlorine and hydrocloric acid gas present in said remaining gaseous products.

16. The process of treating calcium phosphate, consisting in heating a charge of calcium phosphate and carbon to a red heat or below in the presence of chlorine whereby gaseous products including oxide of carbon and chloride of phosphorus are formed, said chlorine being in excess of the theoretical amount necessary to yield said gaseous products, separating chloride of phosphorus from said gaseous products admixed with excess chlorine, and returning and utilizing in said heating treatment oxide of carbon and excess chlorine delivered from said separation.

ROBERT E. VIVIAN.